United States Patent [19]

Proctor et al.

[11] Patent Number: 5,583,413

[45] Date of Patent: Dec. 10, 1996

[54] POWER CONVERSION EQUIPMENT MONITOR/CONTROLLER METHOD AND APPARATUS

[75] Inventors: Richard L. Proctor, Seattle; Steven H. Kahle, Montlake Terrace; Warren D. Stokes, Sumner; Richard H. Young, Jr., Seattle, all of Wash.

[73] Assignee: Cruising Equipment, Inc., Seattle, Wash.

[21] Appl. No.: 300,979

[22] Filed: Sep. 6, 1994

[51] Int. Cl.$^6$ .......................... H01M 10/46; G01R 31/36
[52] U.S. Cl. .................. 320/5; 320/48; 320/43; 364/483; 340/636; 324/427
[58] Field of Search .................. 320/6, 21, 20, 320/39, 435, 48, 455; 324/428–436; 364/550, 551.01, 481, 557; 340/636; 307/9.1, 10.1, 10.7, 38, 39; 322/28, 78, 14, 54, 69.8; 219/202–203

[56] References Cited

U.S. PATENT DOCUMENTS

| | | | |
|---|---|---|---|
| 3,886,442 | 5/1975 | Chiku et al. | 320/19 |
| 3,938,507 | 2/1976 | Sarnoff et al. | 128/2.06 B |
| 3,971,980 | 7/1976 | Jungfer et al. | 320/48 |
| 4,012,681 | 3/1977 | Finger et al. | 320/48 |
| 4,210,855 | 7/1980 | Harer et al. | 320/13 |
| 4,263,543 | 4/1981 | Watrous et al. | 322/8 |
| 4,536,697 | 8/1985 | Johnston et al. | 322/14 |

(List continued on next page.)

OTHER PUBLICATIONS

Electrical System and Amp Hour Monitor Manual (Jul. 1989).
Power News, vol. 2, Issue 1 (Feb. 1990).
Balanced Energy Systems Catalog (1990).
Installation Manual, AMP–hour+™ meter (Jun. 10, 1994).
Heart Interface; brochure, *Freedom Model 10*.
Heart Interface; Owner's Manual, Freedom 10 Inverter/ Battrey Charger (submitted without a date with the orignal IDS on Dec. 6,1994).
Heart Interface; Installation Guide, *Freedom Series Inverter/Battery Chargers*.

Primary Examiner—Peter S. Wong
Assistant Examiner—Aditya Krishaun
Attorney, Agent, or Firm—Kolisch Hartwell Dickinson McCormack & Heuser

[57] ABSTRACT

Power inverter equipment monitor/controller method and apparatus are described. The invented apparatus provides for the semi-automatic state steering and monitoring of an inverter/charger and alternator system. A flat panel user interface includes an array of switches, displays and indicators for establishing modes of operation of the system, for initializing operating parameters of the system and a connected battery, for establishing rates for the system's operation, permit the user to monitor the system's operating mode and charging data (including charging efficiency factor or CEF) while it is operating to charge the battery and to supply AC power to connected appliances. By the one of the preferred methods of the invention, ramping-up the alternator's output of current, sustaining the output until the voltage of the battery is acceptable, adjusting the output while maintaining the battery voltage at an acceptable level, reducing output until float level voltage is obtained and further adjusting output to maintain float level voltage to preserve the battery charge. By the other of the preferred methods, certain charge data related to the charging of the battery— including a present CEF, maximum amp-hour charge level capacity of the battery (AH CL capacity), and the present status of amp-hour charge level—are given and stored in memory, the battery is discharged, the lowest-recorded (LR) AH CL is recorded with recharge begins, completing the recharge and storing amount of amp-hours used to recharge, determining an intermediate CEF by dividing AH used-to-recharge battery by difference between the AH CL capacity and LR AH CL, averaging the present CEF with the intermediate CEF to produce a result which is stored in memory as the present CEF, and resetting present status to the AH CL capacity.

22 Claims, 4 Drawing Sheets

U.S. PATENT DOCUMENTS

| | | | |
|---|---|---|---|
| 4,564,896 | 1/1986 | Akerson | 363/24 |
| 4,625,175 | 11/1986 | Smith | 320/48 |
| 4,627,296 | 6/1987 | Griffin | 322/1 |
| 4,678,999 | 7/1987 | Schneider | 320/48 |
| 4,679,000 | 7/1987 | Clark | 320/44 |
| 4,715,381 | 12/1987 | Moberg | 128/419 |
| 4,719,427 | 1/1988 | Morishita et al. | 320/48 |
| 4,803,438 | 2/1989 | Ta | 340/52 R |
| 4,849,700 | 7/1989 | Morioka et al. | 320/48 |
| 4,926,438 | 4/1990 | Collins et al. | 340/636 |
| 4,929,931 | 5/1990 | McCuen | 320/48 |
| 4,947,123 | 8/1990 | Minezawa | 320/48 |
| 4,949,046 | 8/1990 | Seyfang | 340/636 |
| 4,952,862 | 8/1990 | Biagetti et al. | 320/48 |
| 4,958,127 | 9/1990 | Williams et al. | 320/48 |
| 5,032,825 | 7/1991 | Kuznicki | 320/48 |
| 5,047,961 | 9/1991 | Simonsen | 364/550 |
| 5,126,675 | 6/1992 | Yang | 324/435 |
| 5,151,865 | 9/1992 | Blessing et al. | 320/48 |
| 5,233,227 | 8/1993 | Kajimoto et al. | 307/9.1 |
| 5,264,777 | 11/1993 | Smead | 320/6 |
| 5,315,287 | 5/1994 | Sol | 340/455 |
| 5,317,269 | 5/1994 | Mills et al. | 340/636 |
| 5,321,627 | 6/1994 | Reher | 364/483 |

POWER CONVERSION EQUIPMENT MONITOR/CONTROLLER METHOD AND APPARATUS

BACKGROUND

The present invention relates generally to power conversion equipment such as inverter and battery charger systems. More particularly, the invention concerns method and apparatus for semi-automatically and remotely monitoring the performance of and controlling such systems.

Power conversion equipment such as power inverters and battery chargers are known to provide for the efficient charging and recharging of batteries of both the wet-cell and gel-cell, so-called deep-cycle type. These batteries typically have a twelve volt (12 V) or 24 V capacity. One of the best known battery chargers uses three cycles including a first for bulk charging, a second for absorption or acceptance charging and a third for float charging, preferably in the listed order. Additionally, a fourth cycle for equalizing the charge of the battery may follow the float charging cycle upon command of a user.

During the bulk charging cycle, most of the charging current available from the charger is delivered to the battery bank, until such time as the upper charge limit is reached, thereby producing a rapid charging of the battery. During the absorption charging cycle, the battery voltage is held at the upper charge limit and the charging current is gradually ramped down.

During the float charging cycle, the charging current is curtailed and the charger monitors the battery voltage while it drifts down from the upper charge limit. In the float charging cycle, a constant battery voltage is maintained below the gassing point but above the resting voltage of the battery of a fully charged battery. The battery charger only supplies charging current when necessary to maintain the battery voltage. During the float charging cycle, the full output of the battery charger is available to operate any AC appliances that may be connected to the inverter/charger system.

Finally, during the equalizing charging cycle, periodically equalization is accomplished by applying an equalization current to the battery. Such causes wet cell batteries to gas profusely, the beneficial effects of which are removal of residual lead sulfate, restoring all cells to the same potential and mixing up the electrolyte.

Those of skill in the art will appreciate that even such advanced inverter/charger systems have no provision for user-specified monitoring and controlling levels at a conveniently located flat panel user interface fittable in a console of a marine or recreational vehicle, or fixable within an alternative energy residence.

SUMMARY OF INVENTION

The invented monitor/controller provides for the semi-automatic state steering and monitoring of an inverter/charger of the type described immediately above. A flat panel user interface includes an array of switches, displays and indicators for establishing modes of operation of the inverter/charger, for initializing operating parameters of the inverter/charger and a connected battery, for establishing rates for inverter/charger operation, and permit the user to monitor the operating mode, the charging cycle, the charging rate, the charge level and the charging efficiency of the battery system (which includes the inverter/charger and the battery) while it is operating to charge the battery and to supply AC power to connected appliances or loads.

In its preferred embodiment, the apparatus of the invention provides both a numeric liquid crystal display (LCD) and multiple light-emitting diodes (LEDs) as front panel indications of the system's operation. By the one of the preferred methods of the invention, an alternator and an inverter/charger are connected to the battery. They are steered by the monitor/controller to ramp-up the charging current, maintaining the charging current at a given limit until an acceptance voltage level is reached, then maintaining the battery's voltage at the acceptance voltage by controlling the charging current as the battery and load needs dictate. After the charging current falls below a given limit for a defined period of time and battery is determined to be fully charged, the charging current is controlled to maintain a lower float voltage level well below the gassing point of the battery to preserve the battery's charge.

By the other of the preferred methods of the invention, certain charge data related to the charging of the battery—including a present charge efficiency factor (CEF), maximum amp-hour charge level capacity of the battery, and the present status of amp-hour charge level—are given and stored in memory, the battery is discharged and the present status is decremented, beginning recharge of battery and storing the present status as the lowest-recorded amp-hour charge level, continuing the recharge of the battery and measuring the amp-hours used to recharge the battery and storing into memory as amp-hours used-to-recharge, completing the recharge, determining an intermediate CEF by dividing amp-hours used-to-recharge battery by difference between the maximum amp-hour charge level capacity and the lowest-recorded amp-hour charge level, averaging the present CEF with the intermediate CEF to produce a result which is stored in memory as the present CEF, and resetting the present status of amp-hour charge level to the maximum amp-hour charge level capacity of the battery.

These and other objects and advantages of the invention will be more fully understood by reference to the accompanying drawings and the detailed description to follow.

DETAILED DESCRIPTION OF THE PREFERRED EMBODIMENT

Figure 1:
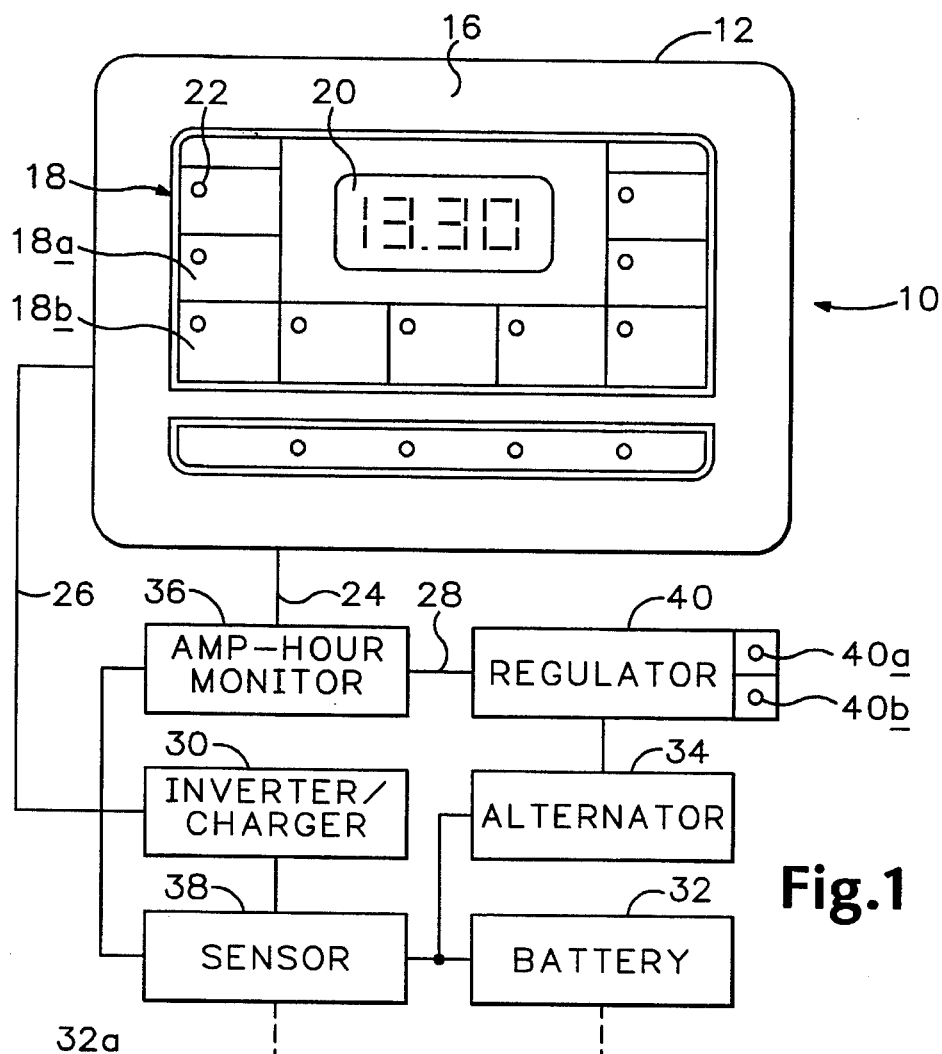
FIG. 1 is a system block diagram of the invented apparatus made in accordance with a preferred embodiment of the invention.

Referring to FIG. 1, the apparatus of the invention made in accordance with its preferred embodiment is indicated generally at 10. Apparatus 10 preferably includes a housing or enclosure 12 for electronic circuitry 14 (inside the housing and shown in FIG. 2). Preferably, housing 12 is lidded or closed by a flat-panel cover 16 providing an array of push-button switches such as 18a, 18b in the form of a molded keypad or keyboard 18, a display such as 4½-digit numeric liquid crystal display (LCD) 20 and an array of light-emitting diode (LED) indicators 22. Those skilled in the art will appreciate that housing 12 may take any of a variety of shapes, sizes and configurations, within the spirit and scope of the invention.

Preferably, apparatus 10 is adapted for console mounting or retrofit within the control console of a recreational or marine vehicle—or the wall of an alternative energy residence—and within reach by a ribbon cable 24 and a phone line 26 to an outboard regulator circuitry 40 via an outboard amp-hour monitor circuitry 36. The apparatus controls or regulates an alternator 34 via regulator circuitry 40 to which the alternator is connected. Apparatus 10 is preferably connected via a phone line 28 to an inverter/charger 30 which in turn is connected to one or more batteries 32, 32a. Alternatively, battery 32a may be a DC load or alternative power source such as a solar panel.

An alternator 34 is connected to one or more batteries 32, 32a to provide DC current to charge the batteries. Preferably, the alternator includes a sensor to measure the current produced by the alternator. The alternator, inverter/charger, and batteries are usually part of the vehicle's or residence's power subsystem.

Moreover, a current and voltage sensor 38 is connected to the battery (or batteries) to provide a means of measuring the current flowing through the battery and voltage across the battery. The sensor is connected to amp-hour monitor circuitry 36, and they are in communication with a microcontroller (described later) to function as an ammeter to measure the current flowing through the battery and a voltmeter to measure voltage across the battery. Preferably, the sensor includes a 500 amp/50 millivolt (50 mV) dual-shunt (a dual-shunt is used in a system with two batteries).

A regulator circuitry 40 for regulating an alternator is connected to amp-hour monitor circuitry 36 and alternator 34. The regulator circuitry preferably includes a high side field-effect-transistor (FET) driver with a voltage doubler and an alternator current buffer. Regulator circuitry 40 also includes an enablement LED indicator 40a for indicating whether the regulation function is enabled or activated and an intensity-variable drive LED indicator 40b for indicating the relative intensity of the drive current that the regulator uses to control the alternator's output of current. The primary purpose of these LED indicators in the preferred embodiment is for status information and trouble-shooting.

Front panel push-button switches such as 18a, 18b (of which, as illustrated, there are more than two in the preferred embodiment of the invention) permit selection of measured or derived system variable to be displayed on LCD 20, and facilitate manual user control of the mode of operation, e.g. inverter versus charger mode, of the vehicle's power subsystem. LED indicators 22 are used to indicate various user selections and operational modes, thereby augmenting 4½-digit numeric LCD 20.

In accordance with the preferred embodiment of the invention, display options include voltage, amperage, amp-hours consumed, charging efficiency and various status indicators including AC power present and charge, acceptance and float modes of operation. Control options include idle mode load sensitivity selection, load-limiting power share AC current limit selection, set up, minimum fully charged battery voltage (acceptance voltage) selection, minimum fully charged current selection (fully-charged-indication current determined by a small percentage of the battery capacity), battery capacity selection, ambient temperature selection and start equalization selection. It will be appreciated that, within the spirit and scope of the invention, more or fewer, or altogether different, controls and indicators are contemplated.

Figure 2:
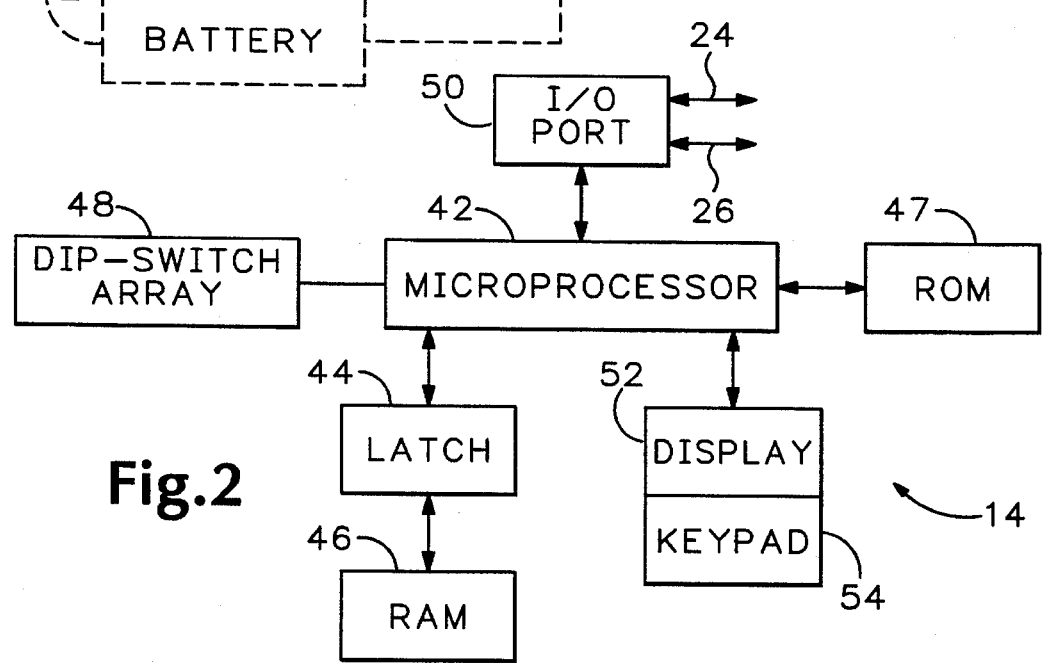
FIG. 2 is a schematic block diagram of the controller portion of the system illustrated in FIG. 1.

Referring now to the more detailed schematic diagram of FIG. 2, the heart of electronic circuitry 14 is a crystal oscillator-driven microcontroller 42 such as an 80C552 microprocessor, an address latch 44, a read-and-write memory (RAM) 46, a read-only-memory (ROM) 47, a dip-switch array 48, an input/output (I/O) port 50, a display 52, and a keypad 54. Display 52 includes LCD display 20 and LED indicators 22. Keypad 54 includes molded keyboard 18 and push-button switches 18a, 18b.

The microprocessor executes instructions stored in the illustrated onboard ROM performs all switch scanning and display functions, including driving the various LEDs and the LCD (which are part of display 52). The microprocessor also is programmed to perform the monitoring and control functions described above, by suitable programming techniques.

Referring collectively to FIGS. 1 and 2, I/O port 50 provides a means of communication with devices outside of enclosure 12 via a ribbon cable 24 and phone line 26. The I/O port provides a connection of electronic circuitry 14 of the apparatus to amp-hour monitor circuitry 36, regulator circuitry 40 (preferably via phone line 28 and the amp-hour monitor circuitry), and inverter/charger 30. The inverter/charger is preferably connected via standard telephone twisted-pair cabling 26 and transmits various status information to the microcontroller 42 regarding the status of the battery charging condition. The inverter/charger also receives commands from the microcontroller (based upon the user's input) directing the inverter/charger to perform various tasks including entering equalization mode, activating/deactivating the charging function, and activating/deactivating the inverting (DC-to-AC conversion) function.

Referring collectively to FIGS. 1 and 2, the apparatus is used with a battery charging system that includes the battery charger (inverter/charger) 30 for storing AC-to-DC converted electric power in one or more batteries 32, 32a connected thereto. Battery 32 has a charge level that is measured in amp-hours and a charge capacity measured in kilowatt-hours (kWhrs).

The apparatus has current and voltage sensor 38 and amp-hour monitor circuitry 36 in which provides a means of measuring the current flowing through the battery and a means of measuring voltage across the battery. The apparatus includes the microcontroller 42 which is connected to sensor 38 and inverter/charger 30. Connected to microcontroller is a memory for storing various charging data including present charging efficiency factor, a lowest-recorded amp-hour charge level, and a maximum amp-hour charge level capacity of the battery.

The microcontroller calculates the charging efficiency factor (CEF) of the battery charging system and battery and calculates the present state or status of the charge level of the battery measured in amp-hours. During the recharge of the battery, the microcontroller factors in the CEF when calculating the present status of the charge level. The microcontroller reports the results of its calculations, the current flowing through the battery and the voltage across the battery using a display connected thereto.

The initial CEF may be determined by conventional methods. For example, the CEF may be experimentally determined based on tests performed on the specific battery or batteries used with the system or may be experimentally determined based on the type or brand of battery used.

Furthermore, the CEF may be provided by the manufacturer of the battery or batteries. Alternatively, a person experienced with the charging efficiency of batteries may estimate the initial CEF. The initial CEF may be entered into the system by using the keys of the keypad (shown in FIG. 1).

A new CEF may be recalculated each time the battery is recharged; however, in the preferred embodiment, the CEF recalculation only occurs when the battery was discharged at least ten percent before recharge and the battery has been fully recharged based on a measurement of the battery capacity in kWhrs. The preferred embodiment has the threshold requirement for recalculation of CEF to prevent skewed results based on partial recharges.

The microcontroller calculates an intermediate CEF by dividing the number of amp-hour used to charge the battery by the difference between the maximum amp-hour charge level capacity and the lowest-recorded amp-hour charge level and then averaging the present CEF with the intermediate CEF to produce a result which is stored in the memory (RAM) 46 as the present CEF—the result becomes the present CEF.

The apparatus has a keypad 54 which is connected to and scanned by microcontroller 42 and based on the user input on the keypad different information is displayed including battery voltage, battery current, present CEF, and present status of the amp-hour charge level.

Furthermore, the apparatus can function as a remote controller distally connected to inverter/charger 30. The user may set various setup parameters to control the inverter/charger. Some of setup parameters include an acceptance voltage, a fully-charged-indication current, a maximum amp-hour charge level capacity, an idle mode sensitivity of the inverter/charger and a load-limit AC power share of the inverter/charger. Also, the user can activate the equalization mode or cycle of the inverter/charger.

The default for the idle mode in the preferred embodiment is 4 Watts which means that it takes a four watt (4 W) AC load to turn the inverter on from its low power idle mode. The purpose of the power sharing feature is to automatically reduce the charger output, and therefore the AC power consumption, if the load passing through the inverter's automatic transfer switch exceeds the setup value. This load management feature helps prevent AC supply breakers from tripping when the vehicle's electric systems are plugged into AC power and the charger and other loads all come on at once.

Figure 3A:
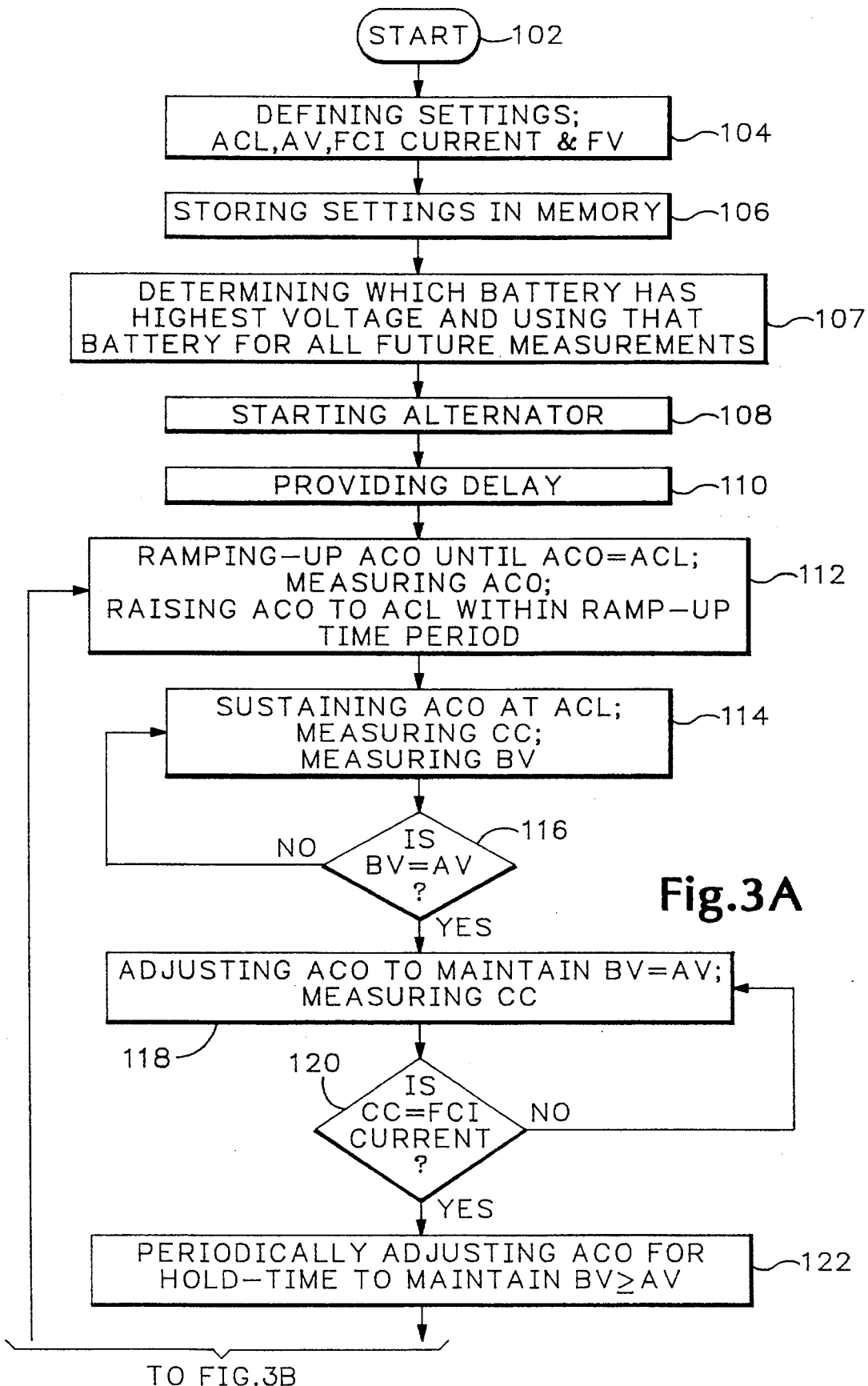
FIGS. 3A and 3B collectively are a high-level flowchart illustrating the first of the two preferred methods of the invention by which the controller operates.
Figure 3B:
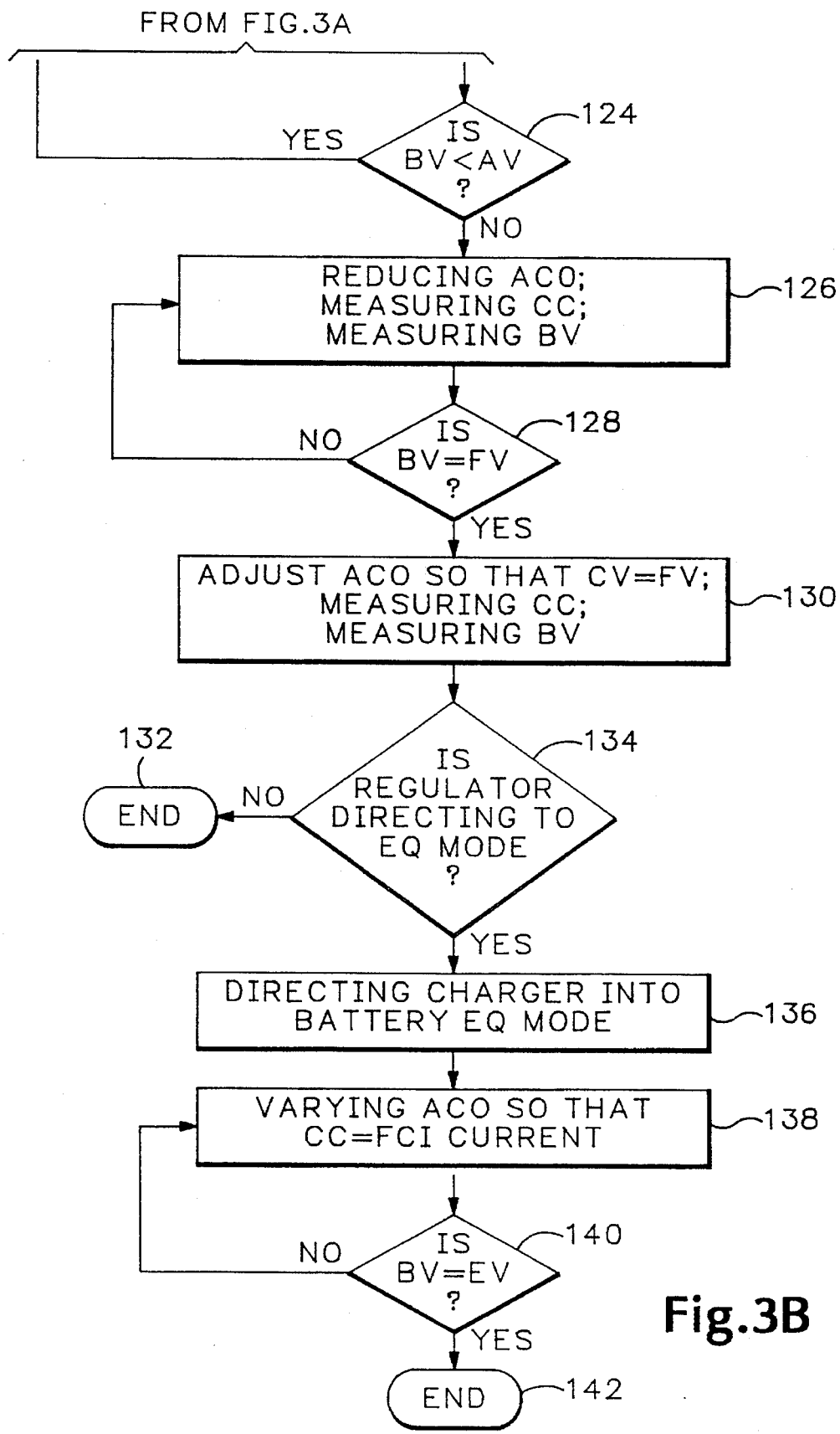

Referring now collectively to FIGS. 3A and 3B, the first of the preferred methods of the invention is illustrated by way of a flowchart. This is a method of regulating an alternator for use with a system that includes an alternator that supplies a variable current to a multi-cycle battery charger system connected thereto. The battery charger system includes a battery charger which is connected to a battery (to be charged) wherein the battery has a battery voltage that depends upon present charge condition of the battery. The voltage of the battery will be higher when the battery is fully charged than when the battery is discharged (i.e., less than fully charged). When the battery is fully charged, it has a maximum charge capacity measured in kWhrs.

This preferred method starts at 102 in FIG. 3A. At 104, the various settings are defined including alternator-current-limit (ACL), acceptance voltage (AV), fully-charged-indication current (FCI current) and float voltage (FV). The ACL is the maximum limit of the current that the alternator can produce and the AV is the voltage at which a battery is nearing its maximum charge but still accepting some charge (the default for the preferred embodiment is 14.4 V for a 12 V battery). The FV is less than the AV (default for the preferred embodiment is 13.5 V for a 12 V battery) and is the voltage that is sufficient to maintain the fully charged condition of the battery. The FCI current is preferably defined as a percentage of current of the battery capacity. At 106, these settings are stored into a memory connected to the regulator.

In the first preferred method of the invention, the voltage settings—including the AV and the FV—are modified or adjusted according to calculations based on several factors. The factors affecting the AV and the FV settings include the state of the charging cycle of the battery charger, the battery type (wet-cell or gel-cell) and the ambient temperature setting selected by the user.

In a system charging more than one battery, it is unlikely that all of the batteries will have equal charges and will recharge at the same rate. Also, over-charging a battery can cause damage and shorten the life of the battery. Therefore, the invention's preferred means of dealing with the danger of over-charging and the batteries' different charging characteristics is to base all battery current and battery voltage measurements upon the charging current and the battery voltage of the battery with the highest measured voltage 107.

In this preferred method of this invention used with a system charging more than one battery, the battery with the highest voltage may be redetermined before each battery current and battery voltage measurement. This redetermination is done to prevent over-charging of a battery that recharges at a faster rate than the other batteries.

After the alternator starts 108, there is a short delay 110 to allow time for the engine driving the alternator to start and allow for a slow increase in the PWM (pulse width modulation) of the AC-to-DC power conversion of the charger.

Continuing with the first preferred method of the invention, the ACO (alternator-current-output) is ramped-up until the ACO reaches or is substantially equal to the ACL (alternator-current-limit). The ACL is the maximum current output of the alternator and the default in the preferred embodiment is 100 amps. During the ramping-up, a sensor measures ACO and the regulator raises the ACO to the ACL within a defined ramp-up time period which is defined in firmware (ROM) as twenty to thirty seconds in the preferred embodiment of the invention. Those skilled in the art will appreciate that the defined ramp-up time period may be adjusted to suit the need of any particular type of inverter/charger system or alternator without departing from the spirit and scope of the present invention. The ramping-up of the ACO avoids shock-loading the belts by abruptly starting with full alternator output.

After the ACO is ramped-up to the ACL, the charge cycle begins. During the charge cycle the ACO is held or sustained 114 at ACL as the BV (battery voltage) of the battery increases. The ACO of the alternator, CC (charging current) and BV (battery voltage) of the battery are measured. The charge cycle continues until the BV is substantially equal to an AV (acceptance voltage). In the preferred embodiment of the present invention, the default value of the acceptance voltage is 14.4 V (or 24.8 V for 24 V systems) or the AV can be defined by the user.

After the AV is reached, the acceptance cycle begins. During the acceptance cycle, the ACO is adjusted 118 and the CC is measured. The acceptance cycle guarantees thorough charging by continuing to charge the battery until the CC becomes a small percentage of battery capacity (default for preferred embodiment is 2%). This small percentage of battery capacity defines a fully-charged-indication current (FCI current). The acceptance cycle continues until the CC is substantially equal to the FCI current 120.

The acceptance cycle is followed by the acceptance hold cycle. During the acceptance hold cycle, the ACO is periodically adjusted 122 to maintain BV at or above AV for a hold-time and the CC is measured. The acceptance hold cycle makes sure that the battery has accepted as much charge as it can.

In the preferred embodiment, the hold-time is between five to fifteen minutes if the CC is continuously less than or equal to FCI current and BV is continuously greater than or equal to AV; otherwise, hold-time is eighteen to thirty minutes. Those skilled in the art will understand that the hold-time may be modified—it can even be user defined—without departing from the spirit and scope to the present invention.

Referring now to FIG. 3B, if BV falls below FCI current 124, then the charge cycle begins again by returning to the ramping-up step 112. When the acceptance hold cycle ends (without a repeating of above steps), then the float transition cycle begins.

The float transition cycle begins at 126. The ACO is reduced, CC and BV are measured. Reducing the ACO at this point in the battery charging procedure causes the BV to decrease. The float transition cycle is intended to provide a continuous (i.e., without disruption) alternator output during the cycle change from acceptance to float; thus, avoiding an abrupt transition between these voltages insures that electronic tachometers supplied from the alternator continue to work during the transition. Once BV is substantially equal to a FV (float voltage) 128, then the float cycle begins.

The purpose of the float cycle is to provide a small amount of current when necessary to maintain the charge of the battery. During the float cycle, the ACO is further adjusted 130 so that BV continues to be substantially equal to FV. Also, CC and BV are measured. ACO is zero if BV remains substantially equal to FV but ACO is greater than zero when necessary to maintain BV at FV. The FV is below the gassing point of liquid (wet-cell) batteries and above the resting voltage of a fully charged battery. The float cycle continues until the battery is discharged 132, the regulator or system is deactivated 132 or the battery charger enters another cycle upon the direction of the regulator 134.

Once the system has reached the float mode, the battery is fully charged and can be used by any attached AC appliances. Once the battery is discharged (preferably, a minimum discharge of ten to fifty percent and a maximum discharge of fifty percent), the process can be repeated to recharge the battery using an alternator in a quick and efficient manner. The above described method of the preferred embodiment of the invention allows the deep-cycle batteries of a vehicle (boat or recreational vehicle (RV)) or an alternative energy residence, a remote site to be recharged without the need for a readily available AC outlet. The regulator controlled alternator provides the AC to the battery charger in the manner described above to produce a quick and efficient charge of the deep-cell batteries.

After several recharges, it is advisable to equalize (the advantages of equalization will be described later) a wet-cell battery—as opposed to a gel-cell battery. The equalization of a battery should follow a recharge of a battery. The method of the preferred embodiment regarding the equalization follows the float cycle.

Continuing to refer to FIG. 3B, the regulator directs 136 the battery charger into an equalization mode. During the equalization mode the battery voltage is increased causing the battery bank to gas profusely and will accomplish the following:

(1) Removal of residual sulfate. Each time a battery is cycled and recharged, a small amount of sulfate is left on the plates. Over time, this gradual build-up of sulfate will compromise the performance of the battery. By applying an equalizing charge, this sulfate is returned back to the electrolyte, raising the specific gravity and fully exposing the active material of the plates.

(2) Bring all cells to the same potential. All lead-acid batteries are made-up of individual two volt cells. As the battery bank is cycled, slight differences in the cells results in different cell voltages, affecting the overall charge effectiveness. Equalizing will serve to bring all cells up to the same voltage and the electrolyte in each cell to the same specific gravity.

(3) Mixing up of the electrolyte. There is a tendency in the cell of a battery for the electrolyte to separate into layers of acid and water. The vigorous boiling of the battery during equalizing serves to physically mix the electrolyte.

During the equalization cycle, the ACO is varied 138 so that CC remains substantially equal to FCI current. Also, CC and BV are measured. After a set period of time or when BV is substantially equal to an equalization voltage (EV) 140, then the equalization cycle ends 142. The EV is preferably higher than the AV.

Figure 4:
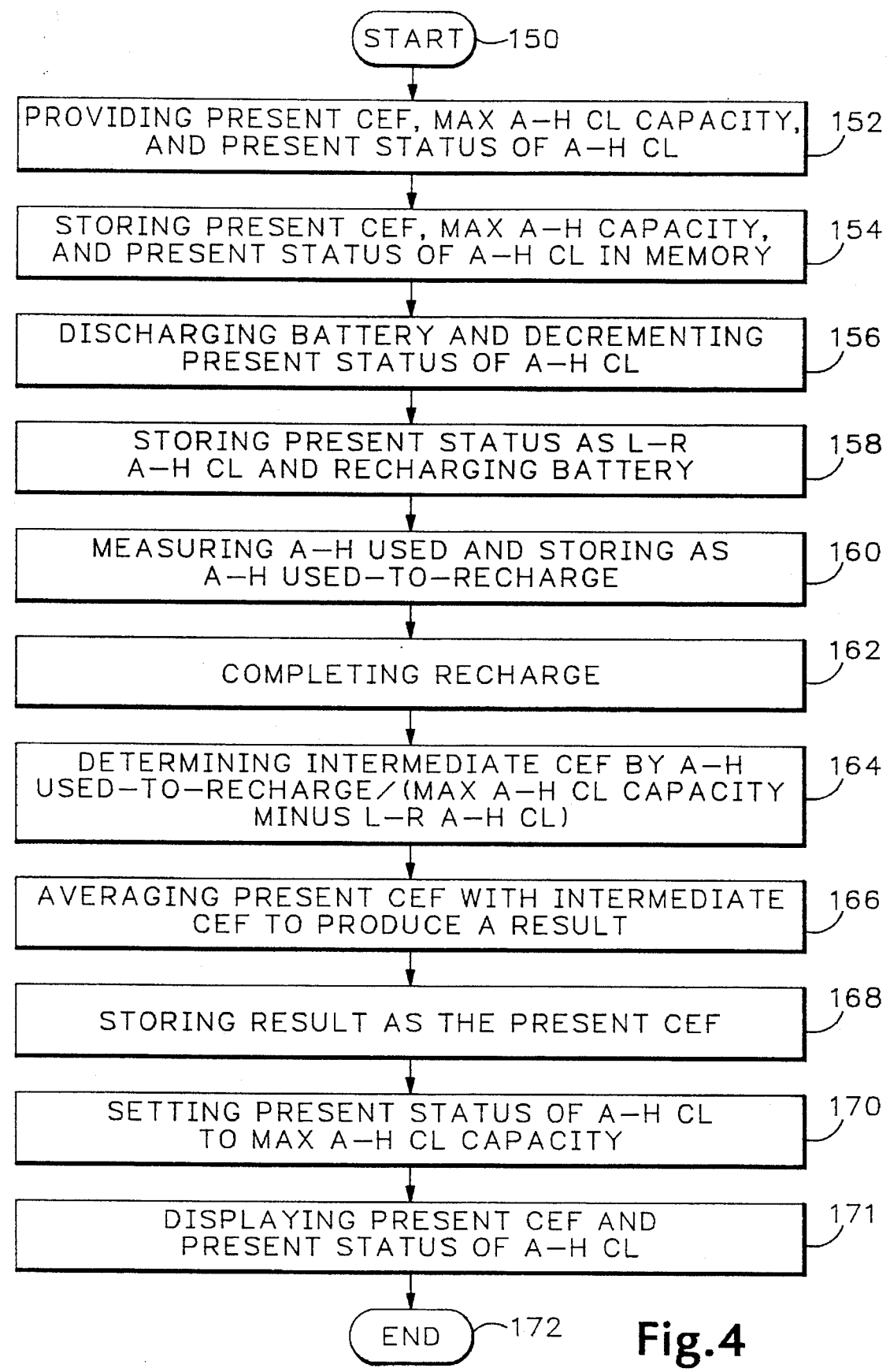
FIG. 4 is a high-level flowchart illustrating the second of the two preferred methods of the invention by which the controller operates.

Referring to FIG. 4, a flowchart illustrates the adaptive charge efficiency factor (CEF) calculation method of the preferred embodiment. The process begins at start 150. Necessary charging data is provided 152 including present CEF, maximum amp-hour charge level capacity (max. A-H CL capacity) and present status of amp-hour charge level of the battery (present status of A-H CL). The charging data is stored 154 in a memory.

While the battery is discharging 156, the present status of A-H CL is decremented. Immediately before the battery is recharged, the present status of A-H CL is stored in memory as the lowest-recorded amp-hour charge level (L-R A-H CL) 158. While the battery is recharging, the amp-hours used to recharge the battery is measured and stored 160 as amp-hours used-to-recharge (A-H used-to-recharge). Upon completion of recharge of the battery 162, the A-H used-to-recharge reflects the amount of amp-hours required to fully recharge the battery.

After complete recharge of the battery, a new CEF is calculated to replace the old CEF to account for the changing, dynamic nature of a deep-cycle battery's life. In this preferred method this invention, a new CEF may be calculated if the battery was discharged a given amount (between eight and twelve percent in the preferred embodiment) and all of the charge (measured in kilowatt-hours or kWhrs) is restored to the battery.

An intermediate CEF is determined 164 by dividing the A-H used-to-recharge by the difference of the maximum A-H CL capacity and the L-R A-H CL. After the intermediate CEF is determined, it is averaged 166 with the present CEF to produce a result that is stored 168 as the new present CEF.

After the new present CEF is calculated, the present status of A-H CL is set 170 to be equal to the max. A-H CL capacity because of the changing CEF of the battery charging system and the battery. The present CEF and present status of A-H CL is displayed 171. After the reset of the present status of A-H CL and display, the process ends 172.

While the present invention has been shown and described with reference to the foregoing preferred method and embodiment, it will be apparent to those skilled in the art that other changes in form and detail may be made therein without departing from the spirit and scope of the invention as defined in the appended claims.

We claim:

1. For use with a system including an alternator that supplies a variable alternator-current-output to a connected battery with a multi-cycle battery charger connected thereto, wherein the battery has a battery voltage and receives a charging current, and wherein the alternator is controlled by a regulator, an alternator current-regulation method comprising:

ramping-up the alternator-current-output until the alternator-current-output reaches an alternator-current-limit, wherein the alternator-current-output is being provided to the battery for charging the battery;

sustaining the alternator-current-output substantially at the alternator-current-limit until the battery voltage is substantially at an acceptance voltage which is indicative of the battery approaching its maximum charge capacity and is greater than a float voltage of the battery;

adjusting the alternator-current-output for maintaining the battery voltage substantially at the acceptance voltage, until the battery's charging current is substantially at a fully-charged-indication current;

reducing the alternator-current-output, which lowers the battery voltage, until the battery voltage is substantially at the float voltage; and further adjusting the alternator-current-output for maintaining the battery voltage substantially at the float voltage to preserve a fully charged condition of the battery.

2. The method of claim 1, wherein the system includes a sensor for measuring and a processor comparing, and wherein the regulator is connected to the sensor and the processor, the method further comprising:

a battery-current measuring of the charging current flowing through the battery;

an alternator-current measuring of the alternator-current-output;

a voltage measuring of the battery voltage across the battery;

an alternator-current comparing of the alternator-current-output to the alternator-current-limit;

a battery-current comparing of the charging current to the fully-charged-indication current;

an acceptance-voltage comparing of the battery voltage to the acceptance voltage; and a float-voltage comparing of the battery voltage to the float voltage.

3. The method of claim 2, wherein the ramping-up step includes an alternator-current measuring of the alternator-current-output and an alternator-current comparing of the alternator-current-limit thereto;

the sustaining step includes a battery-current measuring of the charging current, a voltage measuring of the battery voltage and an acceptance-voltage comparing of the acceptance voltage thereto;

the adjusting step includes a battery-current measuring of the charging current and a battery-current comparing of the fully-charged-indication current thereto;

the reducing step includes a battery-current measuring of the charging current, a voltage measuring of the battery voltage and a float-voltage comparing of the float voltage thereto; and the further adjusting step includes a battery-current measuring of the charging current, a voltage measuring of the battery voltage and a float-voltage comparing of the float voltage thereto.

4. The method of claim 2, wherein the system includes a first battery and a second battery with each having a voltage and receiving a charging current, and wherein the battery-current measuring steps and voltage measuring steps are preceded by:

a measuring of the first battery's voltage and the second battery's voltage;

a comparing of the first battery's voltage to the second battery's voltage; and a using of the first battery for measuring of the battery voltage and of the charging current if the first battery's voltage is greater than the second battery's voltage, otherwise a using of the second battery for measuring of the battery voltage and of the charging current.

5. The method of claim 1, which further comprises before the ramping-up step, a defining of settings for the alternator-current-limit, the acceptance voltage, the fully-charged-indication current and the float voltage, and a storing of the settings in a memory connected to the regulator.

6. The method of claim 5, wherein the setting defining the fully-charged-indication current is a percentage of battery capacity.

7. The method of claim 1, which further comprises before the ramping-up a starting of the alternator by the regulator, and a providing of a delay before the ramping-up.

8. The method of claim 1, which further comprises after adjusting, a step of periodically adjusting the alternator-current-output to maintain the battery voltage for a hold-time.

9. The method of claim 8, wherein the periodically adjusting step includes a repeating of the ramping-up, sustaining and adjusting steps if the battery voltage falls below the acceptance voltage.

10. The method of claim 1, wherein the ramping-up step includes a raising of the alternator-current-output to the alternator-current-limit within a defined ramp-up time period.

11. The method of claim 1, wherein the system further includes the regulator connected to the battery charger and after the further adjusting step, a directing of the battery charger into a battery electrolyte equalization mode, and a varying of the alternator-current-output to maintain the charging current substantially at the fully-charged-indication current, and a continuing of the varying of the alternator-current-output, which raises the battery voltage, until the battery voltage is substantially at an equalization voltage.

12. For use with a system including a battery charger, a battery, and a controller having a processor for storing data into a memory connected thereto, wherein the battery has a present charge efficiency, an adaptive charge efficiency factor determination method comprising:

a providing of a present charge efficiency factor, a maximum amp-hour charge level capacity of the battery, and a present status of amp-hour charge level;

a storing of the present charge efficiency factor, the maximum amp-hour charge level capacity of the battery, and the present status of amp-hour charge level in the memory;

a discharging of the battery and while discharging, decrementing the present status of amp-hour charge level;

a recharging of the battery and a storing of the present status of amp-hour immediately before recharging in the memory as the lowest-recorded amp-hour charge level;

a measuring of amp-hours used to recharge battery and a storing in memory the amp-hours used as amp-hours used-to-recharge the battery;

a completing of the recharging of the battery;

a determining of an intermediate charge efficiency factor by dividing amp-hours used-to-recharge battery by difference between the maximum amp-hour charge level capacity and the lowest-recorded amp-hour charge level;

an averaging of the present charging efficiency factor with the intermediate charge efficiency factor to produce a result, whereby the result more accurately represents the present charge efficiency of the battery than does the present charge efficiency factor; and a storing of the result in memory as the present charge efficiency factor so that the present factor more accurately represents the present charge efficiency of the battery.

13. The method of claim 12, which further comprises, following the storing of the result, a step of setting the present status of amp-hour charge level to the maximum amp-hour charge level capacity.

14. The method of claim 12, for use with a display connected to the controller, which further comprises a displaying of the present charge efficiency factor and the present status of amp-hour charge level.

15. A battery charge monitoring apparatus for use with a battery charging system which includes a battery charger for storing AC-to-DC converted electric power and a battery connected thereto, wherein the battery has an amp-hour charge level and a present charge efficiency, the apparatus comprising:

an ammeter connected to the battery, the ammeter for measuring current flow through the battery;

a processor for calculating a present charge efficiency factor, wherein during a charging of the battery, the processor calculates a present status of the amp-hour charge level based on the present charge efficiency factor, the processor being connected to the ammeter and the battery charger;

a display that indicates the present charge efficiency factor and the present status of the amp-hour charge level of the battery, wherein the display is connected to the processor; and a memory connected to the processor, wherein the memory is for storing the present charge efficiency factor, a lowest-recorded amp-hour charge level and a maximum amp-hour charge level capacity of the battery, and wherein after the battery charger fully charges the battery, the processor calculates an intermediate charge efficiency factor by dividing amp-hours used to charge battery by a difference between the maximum amp-hour charge level capacity and the lowest-recorded amp-hour charge level and averaging the present charging efficiency factor with the intermediate charge efficiency factor to produce a result, whereby the result more accurately represents the present charge efficiency of the battery than does the present charge efficiency factor, and the processor stores the result into the memory as the present charge efficiency factor.

16. The apparatus of claim 15, which further comprises:

a voltmeter connected to the battery, the voltmeter for measuring voltage across the battery, and wherein the display further indicates a voltage across the battery and the current flow through the battery, wherein the voltage is measured by the voltmeter and the current flow is measured by the ammeter.

17. The apparatus of claim 16, further comprising a console including:

a processor-scanned keypad with keys, wherein the keypad is connected to and scanned by the processor, and the display, wherein the display further indicates a present status of charging data when a user selects a key on the keypad, wherein each key is associated one or more of the charging data and wherein the charging data include the voltage across the battery, the current flow through the battery, the present charge efficiency factor, and the present status of the amp-hour charge level of the battery.

18. The apparatus of claim 15, further comprising a regulator for regulating an alternator's current output, wherein the regulator is connected to the processor and to an alternator, and wherein the regulator includes an enablement indicator for indicating the enablement of the regulator and a drive indicator for indicating an intensity of a drive current that the regulator sends to the alternator for controlling operation of the alternator.

19. The apparatus of claim 15, further comprising a remote controller connected to the battery charging system, wherein the system includes an inverter/charger that includes the battery charger and an inverter, the controller including:

a processor-scanned keypad for receiving a user-input, wherein the keypad is connected to the processor, and the processor, wherein the processor is for scanning the keypad, storing setup parameters in a memory connected thereto, and controlling the inverter/charger based on the user-input and the setup parameters of the inverter/charger.

20. The apparatus of claim 19, wherein the setup parameters include an idle mode sensitivity of the inverter/charger and a load-limit AC power share of the inverter/charger.

21. The apparatus of claim 19, wherein the controller activates a battery equalization mode of the inverter/charger.

22. The apparatus of claim 19, wherein the setup parameters include an acceptance voltage, a fully-charged-indication current, and a maximum amp-hour charge level capacity.

* * * * *